United States Patent [19]

McClung

[11] Patent Number: 4,917,932
[45] Date of Patent: Apr. 17, 1990

[54] FLOOR MAT WITH A NON-SLIDABLE SURFACE

[76] Inventor: Scott D. McClung, 49 La Senda, South Laguna, Calif. 92677

[21] Appl. No.: 105,146

[22] Filed: Oct. 5, 1987

[51] Int. Cl.⁴ .............................................. B32B 33/00
[52] U.S. Cl. ......................................... 428/90; 428/95
[58] Field of Search .................................... 428/90, 95

[56] References Cited

U.S. PATENT DOCUMENTS 4,377,610  3/1983  McClung ............................. 428/90

Primary Examiner—Marion C. McCamish
Attorney, Agent, or Firm—W. Edward Johansen

[57] ABSTRACT

The present invention is a floor mat which is for use on a floor of an automobile. The floor mat includes a base with a non-slidable bottom surface and a top surface ground and a layer of carpet material. The base is formed from a mixture of crumb rubber and poly vinyl chloride. The mixture is heated in order to cure the poly vinyl chloride thereby setting the crumb rubber therein. The crumb rubber is 20 to 45 percent by volume of the mixture and the poly vinyl chloride is 55 to 80 percent by volume of the mixture. A layer of carpet material which is mechanically coupled to the top surface of the base. The layer of carpet material is a carpet. The floor mat also includes an adhesive layer which is disposed on the cloth layer and a plurality of bristles which are electrostatically flocked onto the adhesive and permanently bonded thereto. The bottom surface of the base is disposed on the floor of the automobile. A heel pad is disposed on the flocked top surface of the base of the floor mat in order to protect the flocked top surface of the floor mat from wear and tear from the heel of the foot of a driver.

1 Claim, 1 Drawing Sheet

Fig. 1.
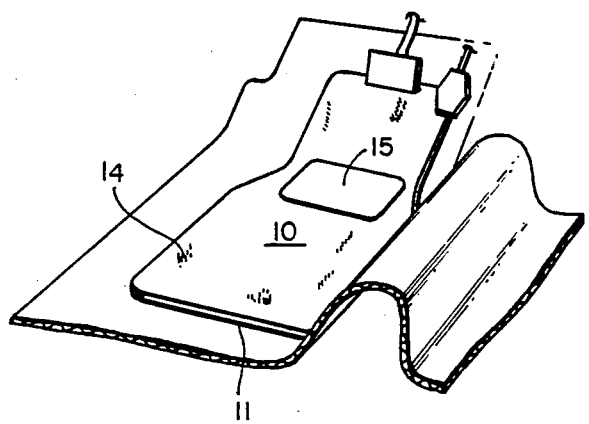
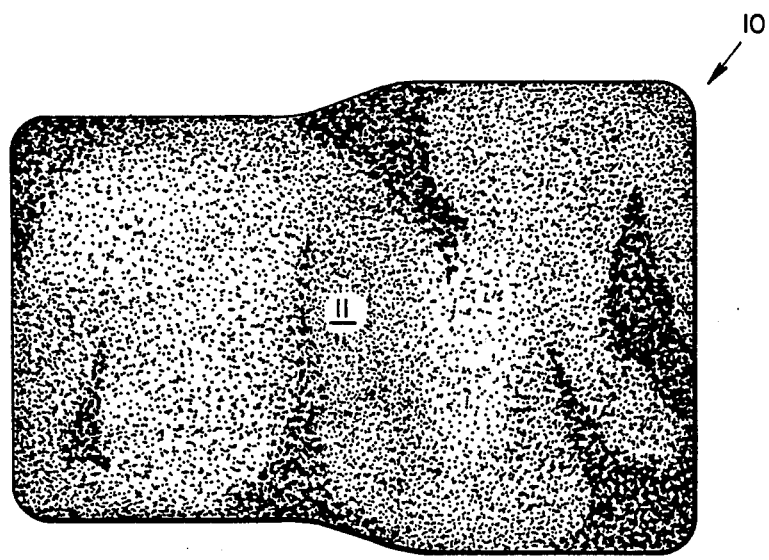
Fig. 2.
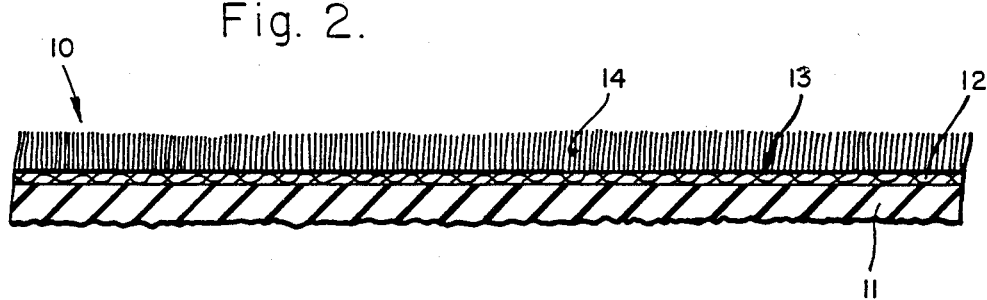
Fig. 3.

FLOOR MAT WITH A NON-SLIDABLE SURFACE

BACKGROUND OF THE INVENTION

1. Field of the Invention

The present invention relates to a floor mat for use on a floor of an automobile and more particularly to a floor mat with a non-slidable bottom surface so that it does not slide about the floor thereof during use.

2. Description of the Prior Art

In the prior art there have been a number of floor mats for automobiles, but all of these floor mats have a tendency to slide about the floor of an automobile under the pressure of the foot of the driver. This sliding is not only inconvenient to the driver, but may also be dangerous to him. There have been many attempts to solve this problem of the floor mat sliding about the floor of the automobile, but none of the previous solutions has been adequate. A further limitation that the floor mats must be relatively light in weight in order to conserve fuels compounds the difficulty of finding a solution to this problem.

The problems of a floor mat sliding about the floor is not limited to their use in an automobile. This problem occurs with throw rugs in the home. The use of a velcro-type fastening system on the bottom of the floor mat and the floor is an apparent solution. The difficulty with the use of a velcro-type fastening system is that it provides too much fastening capabilities and makes it difficult to remove the floor mats or the throw rugs from the floor in order to clean them.

Among the floor mats of the prior art is a floor mat having base which is formed out of compounded tire rubber. The floor mat has a raised design which may be a series of longitudinally disposed ribs that form grooves for collecting dirt and providing drainage. The floor mat has a plurality of bristles which are electrostatically flocked onto the top surface of the base and permanently bonded thereto adjacent the raised design.

U.S. Pat. No. 2,908,027, entitled Floor Mat, issued to Eugene F. McClung on Oct. 13, 1959, teaches a floor mat which includes a flexible rubber base and a plurality of rubber fabric strips which are mounted in spaced relation on the base and joined thereto. The base is formed with a round-bottom grooves between the strips. The strips are arranged with upwardly extending fibrous cords which are embedded therein. Each strip has an attrite upper surface with ends of fibrous cords extending vertically from the attrite surface and projecting upward from the edges of the attrite surface to fluff over and form flocculent mat surfaces of greater width than the width of the strips.

U.S. Pat. No. 2,901,373, entitled Pattern Flock Fabric and Method for Producing Said Pattern, issued to Ernst Weiss on Aug. 25, 1959, teaches a method for producing a pattern flock fabric for use on a floor mat. U.S. Pat. No. 3,591,401, entitled Flocked, Foamed, Embossed Surface Covering, issued to Robert W. Snyder on July 6, 1971, teaches a method of flocking, foaming and embossing a floor mat. U.S. Pat. No. 4,362,773, entitled Flocked Foamed with Embossed Pattern, issued to Yasuo Shikinami on Dec. 7, 1982, teaches a flocked foam which has an embossed pattern. U.S. Pat. No. 4,018,956, entitled Method of Making a Differentially Shrunk Flocked Fabric Product, issued to James P. Casey on Apr. 19, 1977, teaches a pattern which is printed with adhesive as a design on certain selected areas of a shrinkable substrate and the adhesive is dried. Flock is preferably applied to the design in the selected areas before the adhesive has dried.

U.S. Pat. No. 4,415,618, entitled Non-Slidable Bottom Surface Layer for a Floor Covering, issued to Eugene F. McClung, Jr. on Nov. 15, 1983, teaches a non-slidable bottom surface layer of a floor mat which includes a base with a top surface and a bottom surface. The top surface is mechanically coupled to the base of the floor covering. The base also includes a plurality of bristles which are electrostatically flocked onto its bottom surface and permanently bonded thereto. The plurality of bristles can lock into a carpet covering a floor and prevent lateral sliding of the floor mat when the foot of a driver produces downward and lateral forces on the floor mat. The base may be formed out of compounded tire rubber. The top surface has a raised design for collecting and providing drainage.

U.S. Pat. No. 3,583,890, entitled Underlay for Rugs or Mats to be Placed on a Carpet with a Deep Pile, issued to Claus Kolckmann and Kreis Schwaebisch on June 8, 1971, teaches an underlay for placing a mat and a deep-pile carpet which includes a flexible lattice structure of threads, a non-slip coating on one side of the lattice structure and a textile fiber flock on the other side of the lattice structure. The flock is arranged around the threads of the lattice structure and radically aligned so as to point to the center of the individual threads.

U.S. Pat. No. 3,605,166, entitled Floor Mat Construction, issued to John W. Chen on Sept. 20, 1974, teaches a floor mat construction which is especially suited for use in automobiles. Each floor mat includes a tray, a grate and fastening devices for removably securing the grate in a desired position over the tray. The tray is formed with internal partitions which define a plurality of open top compartments that are formed to hold mud, water and the like in a fixed area against splashing. A grating is formed to fit over the tray and to completely cover the partitions therein. The grate is formed with tapered sides and terminates in knife-like upper edges. The whole floor mat construction is preferably formed of a tough, light resilient material such as rubber of rubber compositions. The grating provides a larger number of smaller openings than the number of compartments which are preferably of the same shape.

U.S. Pat. No. 3,654,657, entitled Foot Mat for Vehicles, issued to Otto Hubel on Apr. 11, 1974, teaches a floor mat of elastomeric material for use in an automobile. The floor mat has honey-comb or alveolar cells in a slanting or inclined arrangement with respect to the base of the foot mat with the cross section of each of the cells increasing from the bottom upwardly towards its upper open end.

SUMMARY OF THE INVENTION

In view of the foregoing factors and conditions which are characteristic of the prior art it is the primary object of the present invention to provide a floor mat which is for use on a floor of an automobile and which has a nonslidable bottom surface so that it does not slide about the floor thereof as a result of the downward and lateral forces of the foot of a driver.

It is another object of the present invention to provide a floor mat which is not only durable, but also light in weight.

It is still another object of the present invention to provide a floor mat with a non-slidable bottom surface which prevents it from sliding about under the downward and lateral forces of the foot of the driver, yet which allows the driver to easily pick up the floor mat from the floor in order to clean it.

In accordance with the present invention an embodiment of a floor mat which is for use on a floor of an automobile has been described. The floor mat includes a base with a non-slidable bottom surface and a top surface ground and a layer of carpet material. The base is formed from a mixture of crumb rubber and poly vinyl chloride. The mixture is heated in order to cure the poly vinyl chloride thereby setting the crumb rubber therein. The crumb rubber is 20 to 45 percent by volume of the mixture and the poly vinyl chloride is 55 to 80 percent by volume of the mixture. A layer of carpet material which is mechanically coupled to the top surface of the base. The layer of carpet material is a carpet. The floor mat also includes an adhesive layer which is disposed on the cloth layer and a plurality of bristles which are electrostatically flocked onto the adhesive and permanently bonded thereto. The bottom surface of the base is disposed on the floor of the automobile. A heel pad is disposed on the flocked top surface of the base of the floor mat in order to protect the flocked top surface of the floor mat from wear and tear from the heel of the foot of a driver.

The features of the present invention which are believed to be novel are set forth with particularity in the appended claims.

Other claims and many of the attendant advantages will be more readily appreciated as the same becomes better understood by reference to the following detailed description and considered in connection with the accompanying drawing in which like reference symbols designate like parts throughout the figures.

DESCRIPTION OF THE DRAWING

FIG. 1 is a perspective view of a floor mat with a non-slidable bottom surface which is disposed on the floor of an automobile and which has been constructed in accordance with the principles of the present invention.

FIG. 2 is a bottom plan view of the floor mat with the non-slidable bottom surface of FIG. 1.

FIG. 3 is a side elevation in cross-section of the floor mat of FIG. 1.

DESCRIPTION OF THE PREFERRED EMBODIMENT

In order to best understand the present invention it is necessary to refer to the following description of its preferred embodiment in conjunction with the accompanying drawing. Referring to FIG. 1 in conjunction with FIG. 2 a floor mat 10 includes a base 11 with a non-slidable bottom surface and a top surface. The floor mat 10 may disposed on the floor of an automobile. The non-slidable bottom surface of the base 11 prevents the floor mat 10 from sliding about the floor thereof as a result of the downward and lateral forces of the foot of a driver. The base 11 is formed from a mixture of crumb rubber and poly vinyl chloride. The mixture is heated in order to cure the poly vinyl chloride thereby setting the crumb rubber therein. The crumb rubber is 20 to 45 percent by volume of the mixture and the poly vinyl chloride is 55 to 80 percent by volume of the mixture. The bottom surface of the base 11 is rough and clings to a carpet floor so that the floor mat 10 is prevented form lateral sliding. The floor mat 10 is not only durable, but also light in weight so that the driver can easily pick it up from the floor in order to clean it.

Referring to FIG. 1 in conjunction with FIG. 3 the floor mat 10 also includes a cloth layer 12, an adhesive layer 13 and a plurality of bristles 14. The cloth layer 12 is disposed on and mechanically coupled to the top surface of the floor mat 10. The adhesive layer 13 is disposed on and mechanically coupled to the cloth layer 12. The plurality of bristles 14 are electrostatically flocked onto the adhesive layer 13 and permanently bonded thereto.

Referring again to FIG. 1 the floor mat 10 further includes a heel pad 15 which is disposed on its flocked top surface of the floor mat 10. The use of the heel pad 15 protects the flocked top surface of the floor mat 10 from wear and tear from the heel of the foot of a driver.

From the foregoing it can be seen that a floor mat with a non-slidable bottom surface has been described. It should be noted that the sketches are not drawn to scale and that distance of and between the figures are not to be considered significant.

Accordingly it is intended that the foregoing disclosure and showing made in the drawing shall be considered only as an illustration of the principles of the present invention.

What is claimed is:

1. A floor mat which is for use on a floor carpet of an automobile, said floor mat comprising:
   a. a base with a non-slidable bottom surface and a top surface, said base being formed from a mixture of crumb rubber and poly vinyl chloride which is heated in order to cure said poly vinyl chloride thereby setting said crumb rubber therein wherein said crumb rubber is 20 to 45 percent by volume of said mixture and said poly vinyl chloride is 55 to 80 percent by volume of said mixture;
   b. an adhesive layer which is disposed on said top surface of said base; and
   c. a plurality of bristles which are electrostatically flocked onto said adhesive layer and permanently bonded thereto wherein said bottom surface of said base is disposed on the floor of the automobile so that it grips the floor carpet of the automobile.

* * * * *